(12) United States Patent
Guillemette et al.

(10) Patent No.: US 10,836,089 B2
(45) Date of Patent: Nov. 17, 2020

(54) MULTICOMPONENT APPROACH TO STANDARD AND MICROLAYER COEXTRUSION

(71) Applicant: GUILL TOOL & ENGINEERING, CO., West Warwick, RI (US)

(72) Inventors: Richard Guillemette, West Warwick, RI (US); Robert Peters, West Warwick, RI (US)

(73) Assignee: Guill Tool & Engineering Co., Inc., West Warwick, RI (US)

( * ) Notice: Subject to any disclaimer, the term of this patent is extended or adjusted under 35 U.S.C. 154(b) by 0 days.

(21) Appl. No.: 14/627,254

(22) Filed: Feb. 20, 2015

(65) Prior Publication Data

US 2015/0298380 A1    Oct. 22, 2015

Related U.S. Application Data

(60) Provisional application No. 61/942,525, filed on Feb. 20, 2014.

(51) Int. Cl.
*B29C 48/16*     (2019.01)
*B29C 48/09*     (2019.01)
(Continued)

(52) U.S. Cl.
CPC .............. *B29C 48/09* (2019.02); *B29C 48/06* (2019.02); *B29C 48/21* (2019.02); *B29C 48/0013* (2019.02); *B29C 48/05* (2019.02); *B29C 48/30* (2019.02); *B29C 48/304* (2019.02); *B29K 2101/00* (2013.01); *B29K 2105/12* (2013.01); *B29K 2995/0056* (2013.01)

(58) Field of Classification Search
CPC ............ B29C 47/0023; B29C 47/0016; B29C 47/065; B29C 47/0045; B29C 47/04; B29C 47/062; B29C 47/0052; B29C 47/128; B29C 47/266; B29C 47/26; B29C 43/203; B29C 48/21; B29C 48/06; B29C 48/0013; B29C 48/304; B29C 48/307; B32B 1/08; B32B 27/32; A61J 3/00; A61J 3/10; A61K 9/209; A61K 9/28; A61K 9/2072; A61K 9/20; A61K 9/50
USPC .......................................... 425/113; 264/138
See application file for complete search history.

(56) References Cited

U.S. PATENT DOCUMENTS 3,941,550 A  *  3/1976  Marion ............... B29C 47/0047
                                                            425/378.1
4,038,017 A  *  7/1977  Langecker .......... B29C 47/0023
                                                            425/381
(Continued)

FOREIGN PATENT DOCUMENTS

EP            0707938 A2  *  4/1996  ............. B29C 48/08
WO    WO 2012/107760 A2  *  8/2012  ............... A61K 9/50

*Primary Examiner* — Jacob T Minskey
*Assistant Examiner* — Cedrick S Williams
(74) *Attorney, Agent, or Firm* — Ziegler IP Law Group, LLC

(57) ABSTRACT

The aspects of the disclosed embodiments provide unique extrusion methods and apparatus to create a multi-component product made from various streams of molten plastic. The method for creating multicomponent multilayered products includes merging multiple streams containing individualized component and layer designs into a single stream to form a rod, tube, pipe, filament, or profile shape.

12 Claims, 4 Drawing Sheets

(51) Int. Cl.
  *B29C 48/21* (2019.01)
  *B29C 48/06* (2019.01)
  *B29K 101/00* (2006.01)
  *B29K 105/12* (2006.01)
  *B29C 48/30* (2019.01)
  *B29C 48/05* (2019.01)
  *B29C 48/00* (2019.01)

(56) References Cited

U.S. PATENT DOCUMENTS

| | | | |
|---|---|---|---|
| 5,380,479 A * | 1/1995 | Schrenk | B29C 48/71 |
| | | | 264/241 |
| 5,723,157 A * | 3/1998 | Grutjen | B29C 47/22 |
| | | | 264/173.12 |
| 6,120,802 A * | 9/2000 | Breitenbach | A61J 3/10 |
| | | | 424/464 |
| 6,533,565 B1 | 3/2003 | Guillemette | |
| 6,669,458 B2 | 12/2003 | Guillemette et al. | |
| 6,945,764 B2 | 9/2005 | Guillemette | |
| 7,690,908 B2 | 4/2010 | Guillemette et al. | |
| 2003/0107151 A1 * | 6/2003 | Reilly | B29C 48/30 |
| | | | 264/171.26 |
| 2003/0165685 A1 * | 9/2003 | Conn | C08K 5/005 |
| | | | 428/412 |
| 2005/0062185 A1 * | 3/2005 | Piedboeuf | B01F 5/0615 |
| | | | 264/75 |
| 2006/0233880 A1 * | 10/2006 | Lerner | A61K 9/1635 |
| | | | 424/469 |
| 2008/0315449 A1 * | 12/2008 | Guillemette | B29C 47/061 |
| | | | 264/108 |
| 2010/0215879 A1 * | 8/2010 | Dooley | B29C 47/0023 |
| | | | 428/35.7 |
| 2010/0316712 A1 * | 12/2010 | Nangia | A61K 9/0065 |
| | | | 424/472 |
| 2012/0189789 A1 * | 7/2012 | Langlais | B30B 11/221 |
| | | | 428/34.1 |
| 2014/0050782 A1 * | 2/2014 | Edirisinghe | A61K 49/226 |
| | | | 424/451 |
| 2015/0104628 A1 * | 4/2015 | O'Donnell | B32B 27/32 |
| | | | 428/216 |
| 2017/0225380 A1 * | 8/2017 | Neavin | B29C 48/71 |

* cited by examiner

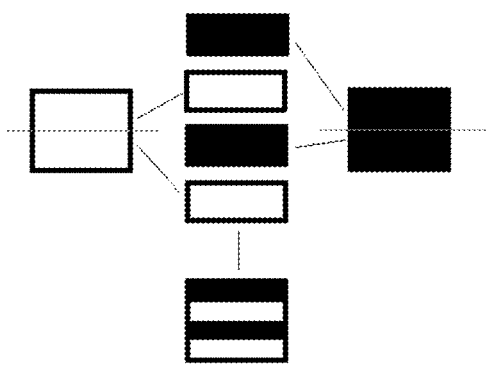
Figure 1
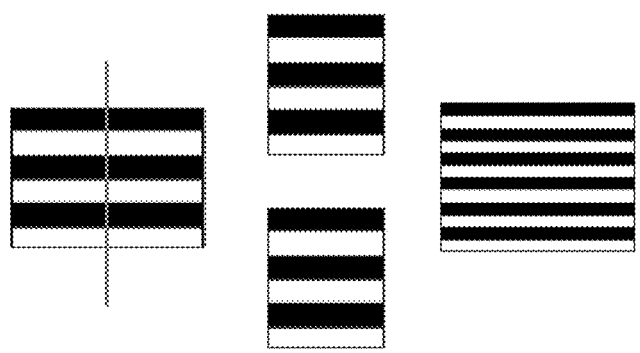
Figure 2
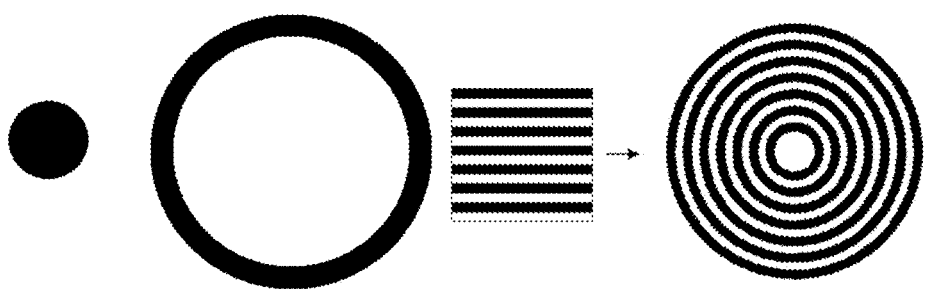
Figure 3(a)                    Figure 3(b)

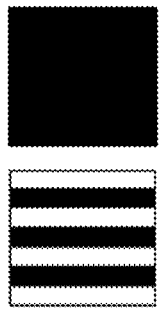 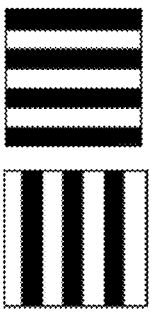 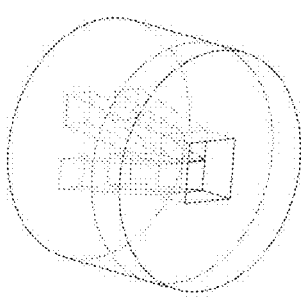 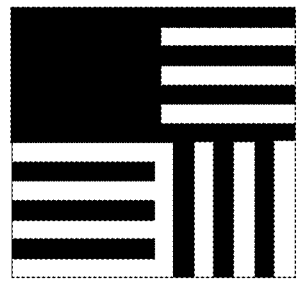
Figure 4(a)　　　　　　　Figure 4(b)　　　　　　　Figure 4(c)
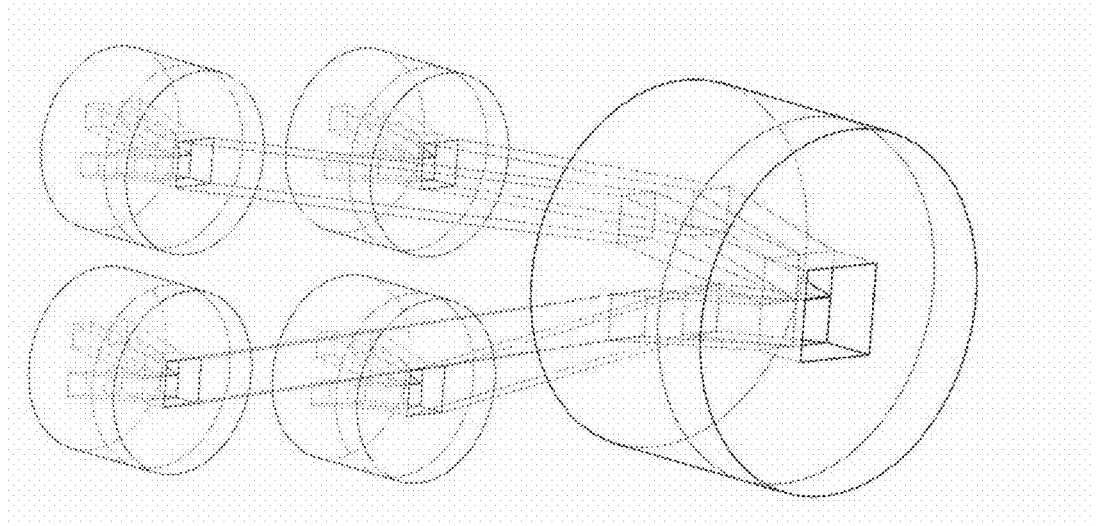
Figure 5

MULTICOMPONENT APPROACH TO STANDARD AND MICROLAYER COEXTRUSION

BACKGROUND

Multilayer coextrusion offers many unique design possibilities in the world of plastics. There are many established technologies for the creation of flat films with tens to thousands of layers. Such technologies generally utilize a feed-block which will either create the layers of polymer through layer by layer addition or create a layer pattern and then multiply it through a layer multiplication technique, or through some combination of the two. Layers of one or more polymer allows for the enhancement and tailoring of material and product properties. Conventional extrusion formed products are limited to approximately twelve layers. Multistream/multilayer extrusion processes can extend these limitations.

Extrusion technologies are well known in the art examples of which are described in U.S. Pat. Nos. 6,669,458, 6,533,565 and 6,945,764, and are commonly owned by the assignee of the instant application. Micro-layer extrusion processes are specialized extrusion methods that provide products with small grain features such as described in U.S. Pat. No. 7,690,908, (hereinafter the "'908 Patent") and U.S. Patent Publication 2012/0189789 (hereinafter the "'789 Publication") both of which are commonly owned by the assignee of the instant application. U.S. patent application Ser. No. 14/084,601 filed Nov. 19, 2013, entitled "Method Of Creating Multilayered Products Through The Folding Of Continuous Layers" refers to other extrusion processes. Each of the aforesaid patent, publication and application are herein incorporated by reference in their entirety.

Typical micro-layer products are formed in a sheet. If a tubular product is desired, the microlayer is first extruded as a sheet and then made into the tube. This creates a weld line or separation between the microlayers. The '908 Patent describes a cyclical extrusion of materials by dividing, overlapping and laminating layers of flowing material, multiplying the flow and further dividing, overlapping and laminating the material flow to generate small grain features and improve properties of the formed product. The '789 Publication describes extruding a flow of extrusion material in a non-rotating extrusion assembly, forming a first set of multiple laminated flow streams from the extruded flow, amplifying a number of the laminations by repeatedly compressing, dividing and overlapping the multiple laminated flow streams, rejoining the parallel amplified laminated flows, forming a first combined laminate output with micro/nano-sized features from the rejoining; and forming a tubular shaped micro-layer product from the combined laminate output.

SUMMARY

The aspects of the disclosed embodiments advantageously provide unique extrusion methods and apparatus to create a product made from various streams of molten plastic. These streams of material could undergo multiple manipulations and be derived from multiple other streams of material. Streams could be comprised of one to thousands of layers of materials in any orientation. There could be any number of streams which would all eventually merge together, all at once or in stages. The merging of all these different streams into a singular stream is what fundamentally defines the multi-component approach. The molten plastic would then proceed through the extrusion head in its newly formed shape. After any compression or other shape modifications the plastic will eventually exit in the desired product shape. This invention expands upon the '789 publication to produce products beyond those comprised of only annular layers. The aspects of the disclosed embodiments can be used with any suitable extrusion die technology, including but not limited to micro and nano layer coextrusion, rotary, conventional multilayer, irregular profile and multi-layer single material die extrusion technology. Products made by a multicomponent extrusion die could be rods, tubes, pipes, filaments, 3D printer filaments, profile shapes, or any other shape and may or may not contain a substrate as a core. The product can contain any number of materials. While most materials will be plastic or a plastic based composite or mixture, other materials which could be processed through an extrusion die such as a low melt temperature metal could be used.

Manipulations of streams play an important role in the aspects of the present disclosure. One such manipulation is the creation of multiple layers from input streams. This could be done by simple side by side merging of streams to achieve a limited number of layers. This could also be done through feedblocks or layer multiplication techniques to achieve any number of layers. The cross section shape of a stream could also be manipulated into other cross-sections. Examples include stretching a stream in one or more direction, compression, transitioning from a circular cross section to that of a square, creating an annular layer or creating a layer capable of wrapping around another stream, or any combination of these methods.

These and other aspects and advantages of the exemplary embodiments will become apparent from the following detailed description considered in conjunction with the accompanying drawings. It is to be understood, however, that the drawings are designed solely for purposes of illustration and not as a definition of the limits of the invention, for which reference should be made to the appended claims. Additional aspects and advantages of the invention will be set forth in the description that follows, and in part will be obvious from the description, or may be learned by practice of the invention. Moreover, the aspects and advantages of the invention may be realized and obtained by means of the instrumentalities and combinations particularly pointed out in the appended claims.

BRIEF DESCRIPTION OF THE DRAWINGS

FIG. 1 depicts the creation of a stream of layers with the use of a feedblock.

FIG. 2 illustrates one method of layer multiplication.

FIGS. 3(a) and 3(b) illustrates two examples of streams being manipulated into annular rings.

FIGS. 4(a)-(c) depicts a merging operation in which four streams are merged together into a single stream.

FIG. 5 illustrates another example of the modular system with multiple extrusion heads.

DETAILED DESCRIPTION OF THE DISCLOSED EMBODIMENTS

Figure 6:
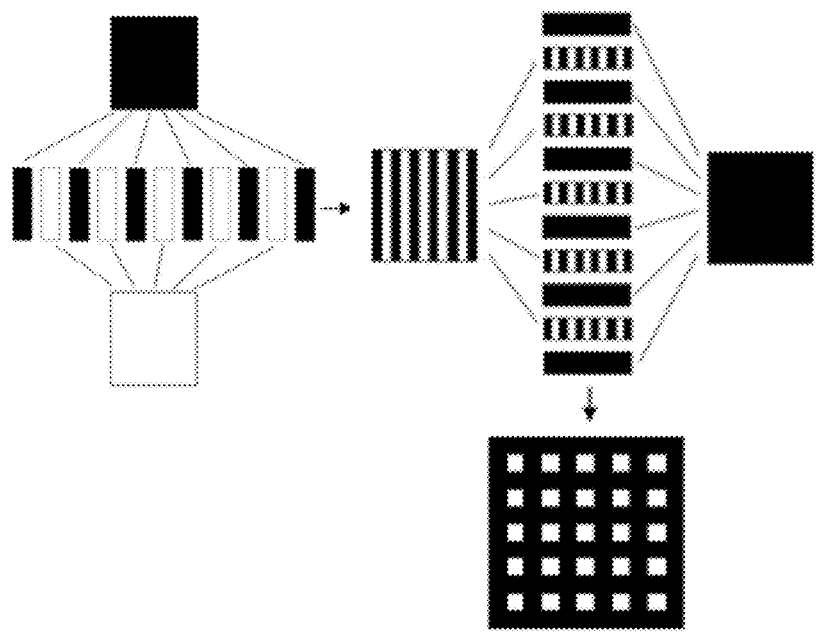
FIG. 6 demonstrates an example process to create a square stream with an array of internal squares.

The present disclosure is generally directed towards multicomponent streams and products. As will be understood, the various diagrams, flow charts and scenarios described herein are only examples, and there are many other scenarios to which the present disclosure will apply.

Turning to FIG. 1 of the drawings, there is shown the creation of a stream of layers with the use of a feedblock. The black and white materials in the figure are split and layered in an alternating fashion to create the stream of layers.

FIG. 2 illustrates a schematic of layer multiplication. The stream of layers on the left (such as the product from FIG. 1) is first split into two halves which are then stacked on top of each other. After merging and compressing into the original cross section, the stream now has twice the number of layers. A process such as this is usually repeatable to create any number of layers. Other layer multiplication techniques could involve folding or wrapping a stream of layers to perform the multiplication, or any combination of these techniques.

FIG. 3 (a and b) illustrates two examples of a stream being manipulated into an annular ring. FIG. 3(b) illustrates the manipulation of a stream, such as the product in FIG. 2, into an annular ring.

FIG. 4 depicts a merging operation in which four streams are merged together into a single stream. The streams comprised of layers could be made by feedblocks. After the four streams merge, this resulting cross section could be used to create another stream, be morphed into yet another geometry, or be extruded as a rod.

As illustrated in FIG. 4(b), an extrusion head can be designed to perform the multicomponent stream merging and manipulations with fixed capabilities as well as with a modular approach. Individual parts or subassemblies could be designed to use the same overall stream cross section as inputs and outputs. Such subassemblies could have multiple inputs and outputs depending on the manipulation being performed. Each subassembly could perform its own manipulation and through switching out subassemblies, the end result of the final product could be changed.

In FIG. 4, each of the input streams could be made by their own subassembly. Three of the streams could be made by feedblocks which would output identically shaped streams (although each stream can be manipulated or rotated as illustrated in FIG. 4). The fourth input stream may be comprised of a single material which could come directly from an extruder. The process could be repeated and expanded as many times as deemed necessary to create the desired profile.

FIG. 5 illustrates another example of the modular system with multiple extrusion heads. By interchanging or varying components, plates or system of components within a given head, one could alter the number of layers, the layer orientation, and the final profile of the product. FIG. 5 above shows how output streams from various components can be inputted into another module later in the process to create a different product. Using these modules in various combinations a wide range of products could be produced with given input streams.

FIG. 6 demonstrates an example process to create a square stream with an array of internal squares. The first step involves introducing a black stream and a white stream (the streams can possess any distinguishable property, the black and white coloring is for illustration purposes only) into a feedblock to create vertical layers. A black stream of material along with the stream of vertical layers could be introduced into another feedblock. The feedblock would split each stream into horizontal strips and layer them on top of each other in an alternating fashion. After the strips merge, the stream could be used to merge with other streams or be morphed into the final cross section. The process could be repeated and expanded as many times as deemed necessary to create the desired profile.

Figure 7A:
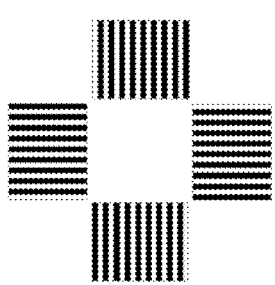
FIGS. 7(a)-(c) depicts the conversion of four streams of layers which could merge together to form a cross section with spokes radiating from the center.
Figure 7B:
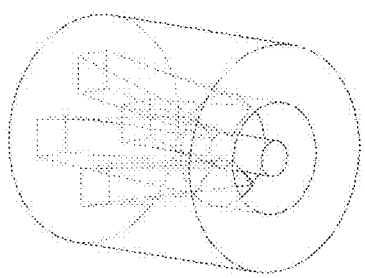
Figure 7C:
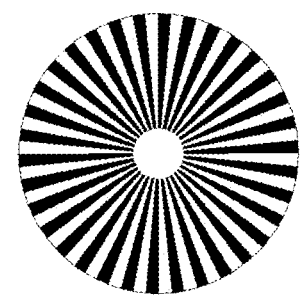

FIG. 7, above, depicts the conversion of four streams of layers which could merge together to form a cross section with spokes radiating from the center.

With the multi-component approach of stream preparation it is possible to design a multitude of shapes and structures within a stream. Along with the ability to reach the micro and nano scale with layers, it is feasible to design for internal features or entire structures to also be in the micro and/or nano scale. Through chemically and/or mechanically removing some layers, these design features could be released and/or exposed to the environment.

Figure 8:
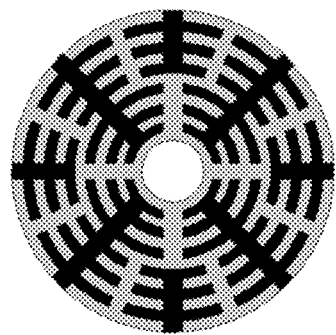
FIG. 8 depicts a cross section that could be created by merging multiple streams with layers with streams containing solid material.

FIG. 8 depicts a cross section that could be created by merging multiple streams with layers with streams containing solid material. Such a product would have a large surface area of contact between different materials. Removal of the black material would result in a product with finned branches and high exposure to the environment. A product made in this manner may become more compressible, porous or foam-like and may have a softer feel.

Figure 9:
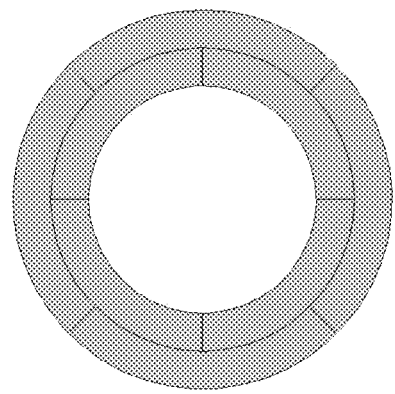
FIG. 9 illustrates the merger of streams so that seams are staggered through the product.

When streams merge together, they form a seam (at the interface of streams). This seam is known to have different properties from the rest of a product and is normally an area of weakness. In order to provide reinforcement to this area, streams could be merged so that seams are staggered through the product (see FIG. 9). Inner and outer skin layers can also be applied through traditional means.

Another embodiment relates to products containing filler particles and/or fibers. Certain products contain filler particles or fibers aligned parallel or perpendicular to the extrusion axis.

Another embodiment relates to products wherein the fibers are carbon fibers, more specifically carbon nanotubules.

Extrusion of multilayer flows allows for enhanced anisotropic alignment of polymer molecules, filler particles or fibers parallel or perpendicular to the axis of extrusion. Filler particles are mostly restrained within each layer and as they approach a magnitude of size similar to the fiber or particle size, shear stresses typically align particles in the direction of the extrusion. Polymer molecules may begin to crystallize as the size of a layer approaches the magnitude of the polymer molecule.

Fillers also refers to flakes such as but not limited to tin flakes.

Fibers include single fibers or a myriad of other arrangements. Some exemplary arrangements include but are not limited to yarns, a tow of fibers or yarns, a weave, a non-woven, chopped fiber, a chopped fiber mat (with random or ordered formats), or combinations of these formats. The chopped fiber mat or nonwoven may be stretched, stressed, and/or oriented to provide some alignment of the fibers within the nonwoven or chopped fiber mat, rather than having a random arrangement of fibers.

Fibers also generally possess an average aspect ratio of 10-3000 and more commonly are fibers having an average aspect ratio of 20-1000. Aspect ratios of 20-350 and 50-200 are specifically envisioned. Various types of organic and inorganic fibers are suitable either in monofilament or stranded form (including bundles of fibers bonded together to make a single element which serves as a single fiber in the sense of orientation and reinforcement).

Filler particles or fibers include but are not limited to wood fibers (including groundwood, thermomechanical pulp (TMP) and bleached or unbleached kraft or sulfite pulps), vegetable fibers (including cellulose, lignin, cotton, hemp, jute, flax, ramie, sisal and bagasse), animal fibers (including proteinaceous strands such as silkworm silk, spider silk, sinew, catgut, wool, sea silk and hair such as cashmere wool, mohair and angora, fur such as sheepskin, rabbit, mink, fox, or beaver), other synthetic polymeric fibers (including rayon, modal, Lyocell polyamide nylon, PET or PBT polyester, phenol-formaldehyde (PF), polyvinyl alcohol fiber (PVA) vinylon, polyvinyl chloride fiber (PVC) vinyon, polyolefins (PP and PE) olefin fiber, acrylic polyesters, pure polyester, aromatic polyamids (aramids) such as Twaron, Kevlar and Nomex, polyethylene (PE), HMPE (e.g. Dyneema or Spectra), polyurethane fiber, and elastomers including spandex), metallic fibers such as those drawn from ductile metals such as copper, gold or silver and extruded or deposited from more brittle ones, such as nickel, aluminum or iron, stainless steel fibers, silicon carbide fibers, clay particles, carbon fibers or glass fibers.

Particularly important fibers and fillers include the so-called micro and nano fibers including but not limited to graphene, graphene oxide, nanocellulose crystals, nanocellulous fibers and/or synthetic nanotubules including but not limited to carbon nanotubes, inorganic nanotubes and/or DNA nanotubes.

Fibers also includes microfibers known as sub-denier fibers (such as polyester drawn to 0.5 dn). Denier and Detex fibers include fibers categorized by weight and length measurements. Fiber designs also includes fibers split into multiple finer fibers. Most synthetic fibers are round in cross-section, but special designs can be hollow, oval, star-shaped or trilobal or a variety of other profiles. The latter design provides more optically reflective properties. Synthetic fibers may also be crimped to provide a woven, non woven or knitted structure. Fiber surfaces can also be dull or bright. Dull surfaces reflect more light while bright tends to transmit light and make the fiber more transparent.

Very short and/or irregular fibers have been called fibrils. Natural cellulose, such as cotton or bleached kraft, show smaller fibrils jutting out and away from the main fiber structure.

Fibers alignment can also be tailored by the application of external forces such as magnetic fields and/or electric fields. These magnetic and/or electrical fields can be induced through a variety of different methods including but not limited to solenoids, permanent magnets, and electrically induced fields.

Another embodiment of the present disclosure relates to extruded multilayer medical devices comprising one or more pharmaceutical product(s) or drug substances (including mixtures thereof) layered with one or more biocompatible materials that control the time release of the delivery of the drug substance or provide a level of abuse-deterrent in product.

Medical devices include but are not limited to catheters, stents, threads, cables (including fiber optic cables), pills, capsules, lozenges, tablets, implants, medical tubing, sheaths, clamps, sutures, tapes, sheets and endotracheal devices.

Another embodiment of the present disclosure relates to a medical tubular device comprising: a polymeric tube containing small sized grains, nano or micro-sized features and a drug substance.

Another embodiment of the present disclosure is directed to extrusion products possessing electrical properties. More specifically, these extrusion products contain multilayers wherein one or more layers contain electrical conducting materials and more specifically nanoparticle electrical conducting materials. Aspects of the disclosed embodiments are also directed to creating and producing micro/nanoparticle products using multilayers/multistreams (and also optionally wherein the layer may be in the micro or nano dimension) to enhance the electrical properties of the products potentially through anisotropic alignment of fillers. The product could act to enhance, inhibit or store electrical current. Also, electrical circuitry could be envisioned for this product, more specifically a microchip type product. In one embodiment, each layer may be comprised of one or more elements that facilitate one or more of the layers to conduct electricity.

One specific embodiment relates to an extruded multi-layer polymer product comprising one or more layers possessing electrical properties. A more specific embodiment relates to a product wherein said one or more layers are milli, micro and/or nano size, wherein said one or more layers contain micro/nanoparticle electrical conducting materials. More specifically wherein said product wherein said one or more electrical conducting layers are layered between non-conducting layers. An example product could have aluminum in outside layers and copper in components in order to have maximum conductivity while resisting oxidation.

Another embodiment relates to Bragg reflector comprising multilayered co-extrusion of micro- to nano-polymer layers in a tubular shape. Such tubular shapes may be of variable length and construction. Certain tubular shapes may or may not contain a core (which may be substantive or hollow). When the core is substantive it may comprise gases, liquids and/or solids. Suitable solids include polymeric materials or matter which is coextruded with the multilayer tube. Such polymeric materials may be transmissible to incident light. Suitable liquids may include but are not limited to water, alcohols and organic liquids.

Bragg reflectors or Bragg fiber can be produced according to the present methods of multilayered co-extrusion technology. Alternating layers of deflected polymeric material form a waveguide that allows the transmittance of electro-magnetic waves. Waveguides are used in a variety of applications, specifically lasers, sensors, and optical fibers. A Bragg reflector can be used to amplify the total internal reflection of a solid optical fiber or be used in a hollow optical fiber to provide the internal reflection.

Alternating layers may be of constant, variable and/or Chirped gradient thickness. Layers ¼ the wavelength of incident light will constructively magnify the incident light. Materials with different refractive indices are layered to produce a Bragg reflector. Light reflects and refracts from each layer interface. By alternating materials of high and low refractive indexes in layers ¼ the wavelength of incident light, the reflected light will constructively interfere with the reflected light from previous layers, amplifying the reflection. The multicomponent approach would allow for multiple wave guides to be formed within the same product. Wave guides could be used to guide the light waves in the direction the product was extruded or across a cross section.

Another embodiment of the present disclosure is directed to extrusion products possessing enhanced barrier properties. A more specific embodiment relates to a product wherein one or more layers are milli, micro and/or nano size. Aspects of the disclosed embodiments are also directed to creating and producing nanoparticle products using multi-layers/multistreams (and also optionally wherein the layer may be in the micro or nano dimension) to enhance the barrier properties of the products.

Another embodiment of the present disclosure relates to a multilayered product for the creation of a membrane or a product with various membrane barrier properties.

Another embodiment of the invention is a multicomponent multilayered product designed specifically for use in additive manufacturing (i.e. 3D printing). These products typically have an outside diameter range of between 1.5 mm and 3.5 mm.

Another embodiment of this invention relates specifically to software and/or hardware created for the purpose of modelling or assisting in the construction of a multicomponent multilayered product or a system to develop multicomponent multilayered products. A software program could be developed so that the user could input the inlet multicomponent multilayered streams, and the software could return a rendering of what the final multicomponent outlet product stream would be. Alternatively, the program could be developed to also allow the user to specify the desired multicomponent product, and the software could return the correct design and orientation of the inlet streams in order to achieve the desired product.

Figure 10:
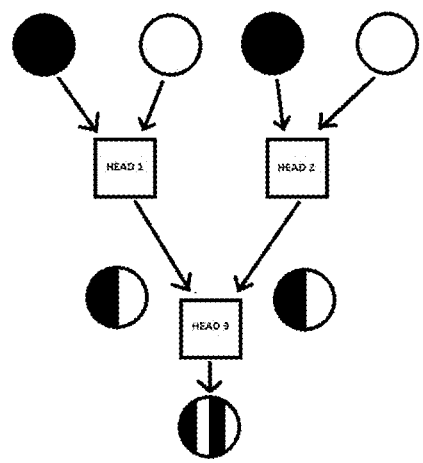
FIG. 10 illustrates a method of the invention using a system of heads, each with independent input and outputs, in an ordered succession in order to create a final desired product.

The invention encompasses the method of using a system of heads, each with independent input and outputs, in an ordered succession in order to create a final desired product, as shown in FIG. 10 above. In this system, the outputs streams from initial extrusion heads are re-extruded as inputs in heads further down the line. Software could be developed to model the sequence of heads necessary in order to produce a desired multicomponent product.

The invention encompasses a quality control mechanism which utilizes a visual inspection feedback mechanism. For example, a visual inspection mechanism can mean a slow-motion camera and corresponding software, wherein the pixel changes captured by the camera are magnified by the software, thus making errors easier to identify. This type of monitoring software could be designed to implement self-correcting measures to automatically adjust the multicomponent product or could be used by an operator to perform the necessary adjustments to correct the product. Any type of visual inspection quality control system is considered an apparent extension of this idea.

Thus, while there have been shown, described and pointed out, fundamental novel features of the invention as applied to the exemplary embodiments thereof, it will be understood that various omissions and substitutions and changes in the form and details of devices and methods illustrated, and in their operation, may be made by those skilled in the art without departing from the spirit or scope of the invention. Moreover, it is expressly intended that all combinations of those elements and/or method steps, which perform substantially the same function in substantially the same way to achieve the same results, are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for creating multicomponent multilayered products comprising:
   merging side-by-side multiple process streams, wherein
   a) each process stream is comprised of one or more component sections with each component section containing singular or multiple materials which may or may not be patterned or in a multiple layer configuration,
   b) least two merging side-by-side multiple process streams including either (i) a multiple component stream of more than one component section with each component section containing a different material or (ii) a multiple material component stream with one or more component sections each containing multiple materials such that (i) the multiple component stream and (ii) the multiple the material component stream each include a pattern or a multiple layer configuration in a pattern or layer orientation,
   c) at least one of said at least two merging side-by-side multiple process streams having (i) the multiple component stream or (ii) the multiple material component stream has a different pattern or multiple layer configuration or a different pattern or layer orientation from at least one other of said at least two merging side-by-side multiple process streams having (i) the multiple component stream or (ii) the multiple material component stream,
   d) at least one of said process streams component sections is the result of layer multiplication techniques, and
   said process streams are merged side-by-side into a single stream to form a rod, tube, pipe, filament, or profile shape,
   wherein the pattern or multiple layer configuration of the (i) multiple component stream or the (ii) multiple material component stream remain in the pattern or multiple layer configuration and the pattern or layer orientation as said process streams are merged side-by-side into the single stream to form the rod, tube, pipe, filament, or profile shape.

2. The method according to claim 1, wherein said multicomponent multilayered product contains a hollow core.

3. The method according to claim 1, wherein said multicomponent multilayered product additionally comprises filler particles or fibers.

4. The method according to claim 1, wherein said multicomponent multilayered product additionally comprises seams between layers that are staggered throughout the product.

5. The method according to claim 1, wherein said multicomponent multilayered product is produced by using an extrusion head that is a modular system devised of plates and/or plate components.

6. The method according to claim 5, wherein said multicomponent multilayered product is produced by using multiple extrusion heads in sequence.

7. The method according to claim 6, wherein said multicomponent multilayered product containing a hollow core.

8. The method according to claim 7, wherein said multicomponent multilayered product containing filler particles and/or fibers.

9. The method according to claim 8, wherein said multicomponent multilayered product comprises seams between layers that are staggered throughout the product.

10. The method according to claim 9, wherein said multicomponent multilayered product with an annular profile with an outside diameter between 1 mm and 5 mm.

11. The method according to claim 1, wherein said multicomponent multilayered product comprises one or more layer(s) containing one or more active pharmaceutical substance(s) or chemical(s), and the product is specifically designed to control the time release nature and/or abuse deterrent properties of this pharmaceutical substance or chemical.

12. The method according to claim 1, wherein said multicomponent multilayered product formed comprises a soft or porous texture and is subjected to further chemically or mechanically processing so as to remove one or more materials or layers.

* * * * *